United States Patent [19]

Henin et al.

[11] 4,392,890

[45] Jul. 12, 1983

[54] CEMENT CLINKER PRODUCTION

[75] Inventors: Jean-Pierre Henin, La Madelaine; Gerard Ghestem, Santes, both of France

[73] Assignee: Fives-Cail Babcock, Paris, France

[21] Appl. No.: 354,347

[22] Filed: Mar. 3, 1982

[30] Foreign Application Priority Data

Mar. 6, 1981 [FR] France .................................. 81 04475

[51] Int. Cl.³ .............................................. C04B 7/02
[52] U.S. Cl. ...................................... 106/100; 432/2; 432/13; 432/117
[58] Field of Search ...................... 106/100; 432/2, 13, 432/117

[56] References Cited

U.S. PATENT DOCUMENTS

| | | | |
|---|---|---|---|
| 4,043,746 | 8/1977 | Ritzmann | 106/100 |
| 4,115,136 | 9/1978 | Hansen | 106/100 |
| 4,286,993 | 9/1981 | Lovichi et al. | 106/100 |

OTHER PUBLICATIONS

Research Disclosure, No. 186 (1979.10), Oct. 1979, 18613.

*Primary Examiner*—James Poer
*Attorney, Agent, or Firm*—Kurt Kelman

[57] ABSTRACT

Cement clinker is produced from cold, dry, finely divided raw material by causing hot flue gases to flow in a first direction out of a rotary kiln and suspending a major portion of the finely divided raw material in the hot flue gases until the raw material has been preheated and at least partially decarbonized. The preheated and at least partially decarbonized raw material is introduced into the kiln. A fraction of the cold, dry, finely divided raw material is pneumatically injected into an end of the kiln to flow countercurrently to said first direction approximately parallel to the axis of the kiln to form a dust cloud of the raw material occupying substantially the entire cross section of the kiln at said end, the end being upstream with respect to a second direction of flow of the raw material into the kiln.

12 Claims, 2 Drawing Figures

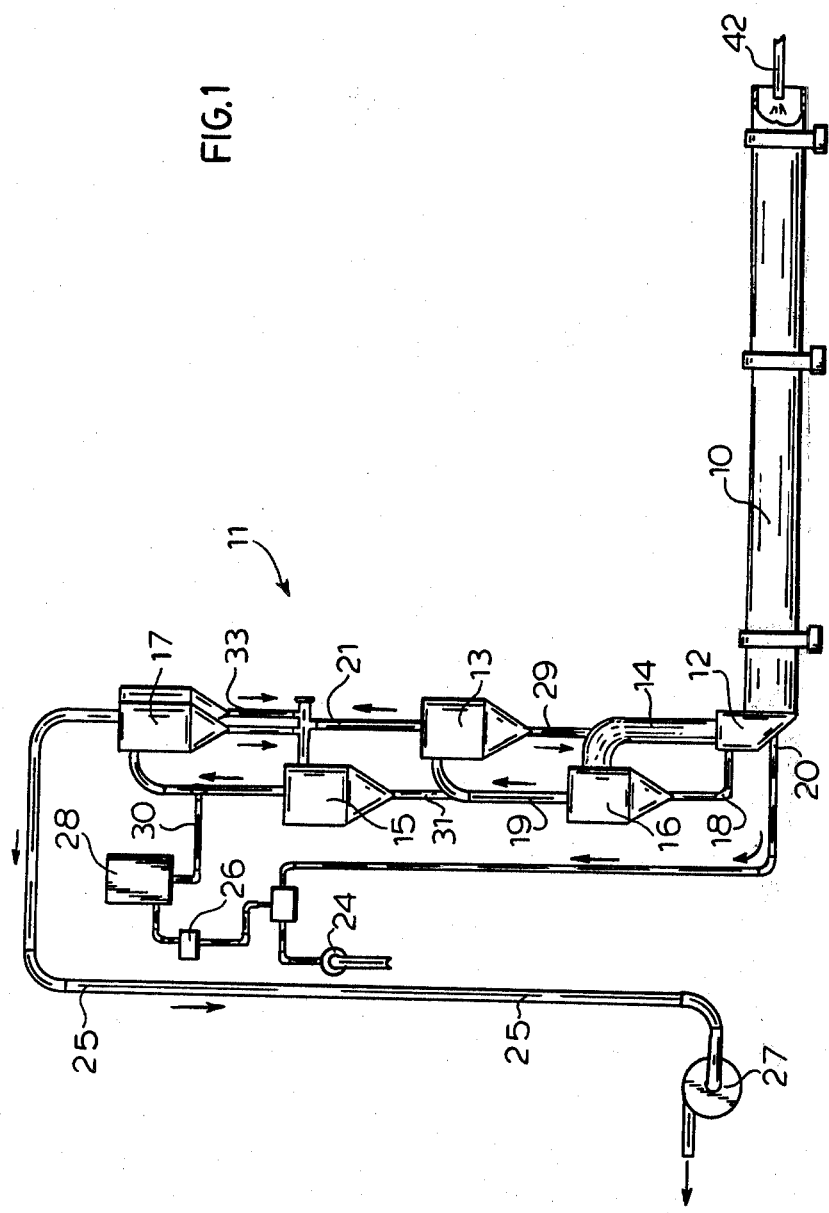

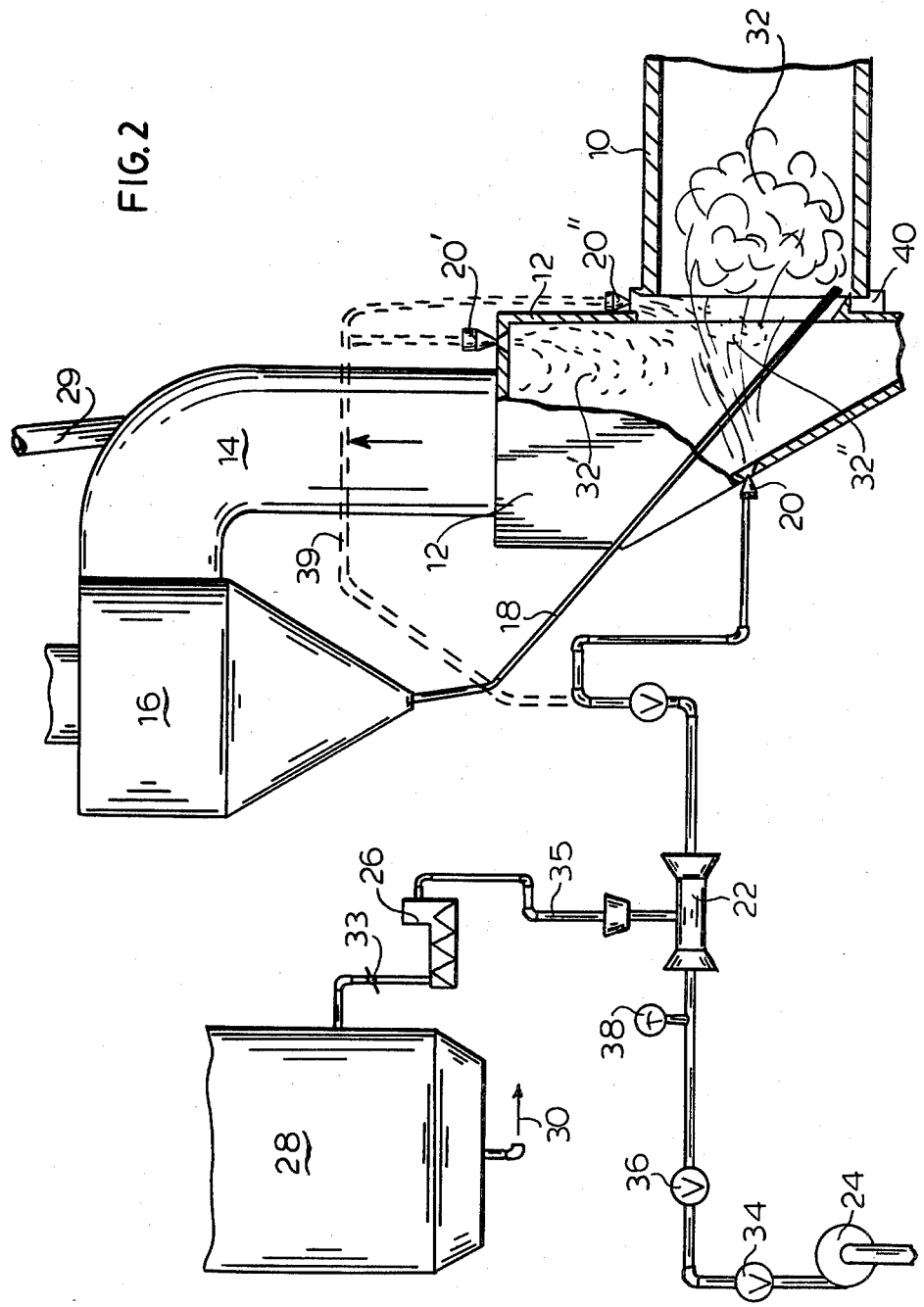

CEMENT CLINKER PRODUCTION

The present invention relates to improvements in a method and installation for the production of cement clinker from cold, dry, finely divided raw material, such as cement raw meal.

In known methods of producing cement clinker, hot flue gases are caused to flow in a first direction out of a rotary kiln having an axis of rotation, a major portion of the finely divided raw material is suspended in the hot flue gases until the raw material has been preheated and at least partially decarbonized, and the preheated and at least partially decarbonized raw material is introduced into the kiln. Conventional cement clinker producing installations comprise a rotary kiln having an axis of rotation and an upstream end, a casing defining a smoke chamber at the upstream end and receiving hot flue gases from the kiln flowing in a first direction, a multi-stage heat exchanger having a last stage and arranged to receive a major portion of the finely divided raw material flowing therethrough to the last stage, a flue connecting the smoke chamber to the last heat exchanger stage and directing the flue gases into the heat exchanger for suspending the major portion of the raw material therein until it has been preheated and at least partially decarbonized, and means for introducing the preheated and at least partially decarbonized raw material into the kiln.

In the production of cement clinker according to these methods and in such installations, the operation is impeded by the formation of encrustations on the walls of the casing defining the smoke chamber and of the flue connecting the smoke chamber to the last heat exchanger stage. During the production of the cement clinker, these encrustations form freely on these fixed parts of the plant and the operation must be interrupted frequently to remove them. The encrustations may be due to divers phenomena. For the sake of simplification, most of the encrustations may be considered to be due to the solidification of volatile components of the raw material and of the flue gases, comprised essentially of alkaline chlorine compounds, and/or to the hardening of materials deposited on the walls by sulfurization or the formation of other compounds under the action of sulfuric and sulforous gases present in the flue gases.

These encrustations are produced generally in those zones where the flue gases at a relatively high temperature, for example of the order of about 1000° C. to 1100° C., contact the raw material at a relatively low temperature, for example of the order of about 600° C. to 800° C. Their formation is favored by a reductive atmosphere in the presence of sulfides rather than sulfates or sulfites.

Two solutions to solve this problem have been used:
(1) The simplest thing is to adjust the composition of the raw material so that a number of favorable operating conditions prevail. These conditions consist essentially of a rather low content of $Cl^-$—ions and of alkaline substances, and a favorable proportion between the contents of sulfur and of alkaline substances. In practice, however, it is often difficult to obtain these conditions, the manufacturer usually not having the facilities for modifying the composition of the raw material.
(2) The commercially most frequently utilized solution consists of limiting the charges of the volatile products and the sulfates in the kiln by removing a portion of the hot flue gases as they leave the kiln and venting them directly to the atmosphere. This is expensive and considerably increases the consumption of energy and of raw material. Furthermore, it is effective primarily with respect to alkaline and chlorine-containing encrustations but much less so with respect to encrustations caused by an excess of sulfuric gas.

It is the primary object of this invention to solve the problem caused by these encrustations in a new manner which is particularly effective in fighting encrustations of a sulfur origin and which causes no more than a very minor thermal loss in the production of the cement clinker.

The above and other objects are accomplished according to one aspect of the invention in the above-indicated production method by pneumatically injecting a fraction of the cold, dry, finely divided raw material into an end of the kiln and countercurrently to the first direction in which the hot flue gases flow approximately parallel to the axis of the kiln to form a dust cloud of the raw material occupying substantially the entire cross section of the kiln at the kiln end, the end being upstream with respect to a second direction of flow of the raw material into the kiln.

According to another aspect of the present invention, a cement clinker producing installation of the above-indicated type comprises a pneumatic injection nozzle mounted in the casing, extending substantially parallel to the kiln axis and directed towards the upstream kiln end for injecting a fraction of the cold, dry, finely divided raw material through the upstream end into the kiln to form a dust cloud of the raw material occupying substantially the entire cross section of the kiln at this end.

In the production of cement clinker according to the present invention, when the hot flue gases from the rotary kiln come into contact with the injected fraction of cold raw material particles, the volatile substances which the gases contain are deposited on the raw material particles or react with the raw material. Some of these particles containing the volatile substances fall into the kiln while another portion thereof is entrained by the hot gases in the smoke chamber and then through the flue connecting the kiln to the preheater into the first stage thereof, where it is mixed with the preheated raw material and introduced into the kiln. The fact that some of the particles containing the harmful substances fall into the rotary kiln permits the circulation of a fraction of these substances to be limited to the kiln itself and, therefore, to limit the amount of these harmful substances circulating in the smoke chamber.

The heat exchange between the hot flue gases and the cold raw material suspended therein in the end of the rotary kiln is very effective, causing the temperature of these gases to be greatly reduced in this zone. This is a favorable factor substantially diminishing the formation of encrustations on the casing walls of the smoke chamber. Some of the particles containing the substances which lead to the formation of encrustations come into contact with the casing and flue walls as they are circulated between the rotary kiln and the heat exchanger but the risk of these particles charged with the harmful substances forming encrustations adhering to the casing and flue walls is much less than if they are directly deposited on these walls.

Where a second injection nozzle injects a further fraction of the cold material into the smoke chamber or the chamber joining the same to the kiln at the upstream end thereof, this curtain of dust will further enhance the above-indicated advantages.

The above and other objects, advantages and features of this invention will become more apparent from the following detailed description of now preferred embodiments thereof, taken in conjunction with the accompanying, generally schematic drawing wherein:

FIG. 1 illustrates an installation for producing cement clinker in accordance with the invention and FIG. 2 is an enlarged showing of the last stage of the heat exchanger and the upstream end of the rotary kiln of this installation, optional features being indicated in broken lines.

Referring now to the drawing, the installation is shown to comprise rotary tubular kiln 10 arranged to rotate about an axis and which has an upstream end with respect to the direction of circulation of the solid raw material which is introduced into the kiln through this end for conversion into cement clinker. Casing 12 defining a smoke chamber is affixed to kiln 10 at the upstream end and receives hot flue gases from the kiln flowing in a first direction. In the illustrated embodiment, a fluid-tight joint 40 defines a chamber joining the upstream kiln end to casing 12. Multi-stage heat exchanger 11 has last stage 16 and is arranged to receive a major portion of a dry, finely divided raw material, such as cement raw meal, which flows therethrough for preheating before it enters the kiln, such heat-exchange preheaters being well known in this art.

As shown, a major portion of the cold, dry, finely comminuted raw material is delivered to inlet 30 in flue 23 connected to first stage 17 of the heat exchanger. Flue 14 connects the smoke chamber defined by casing 12 to last heat exchanger stage 16 and directs the flue gases from the smoke chamber into heat exchanger 11, the illustrated heat exchanger being a four-stage preheater and the circuit of flues comprising flue 14, flue 19 connecting the last stage to next-to-last stage 13, flue 21 connecting stage 13 to second stage 15, flue 23 connecting the second stage to first stage 17 and flue 25 connecting the first stage to the input of fan 27 which forces the flue gases through the heat exchanger and the circuit of flues in the direction of the arrows shown adjacent the flues. The major portion of the comminuted raw material is suspended in the hot flue gases until it has been preheated and at least partially decarbonized, passing through the successive preheater stages and the circuit of conduits 33, 31, 29 and 18, conduit 33 lead from first stage 17 into flue 21, conduit 31 leading from second stage 15 into flue 19, conduit 29 leading from next-to-last stage 13 into flue 14 and conduit 18 leads from last stage 16 through the smoke chamber into the upstream end of kiln 10 for introducing the preheated and at least partially decarbonized raw material into the kiln. The direction of flow of the raw material through the circuit of conduits is shown by arrows adjacent the conduits. The preheater stages are constituted by cyclones and the illustrated first stage is formed by twin cyclones. The cold raw material is held in supply hopper 28 which incorporates a scale for weighing the material delivered to inlet 30. The preheated and decarbonized raw material introduced into the kiln through conduit 18 is displaced to the other end of kiln 10 by the combined action of gravity and the rotation of the kiln. While it passes through the rotating kiln, the raw material is contacted by hot gases produced in the kiln chamber by burner 42 which extends into the other kiln end and which produces a counter-current flow of the gases. The heat of these gases permits the completion of decarbonization, if necessary, and converts the material to clinker.

According to the present invention, dosing device 26 is connected to hopper 28, valve 33 being arranged in the delivery conduit of the cold raw material to the dosing device to control the flow of the raw material so as to obtain a desired fraction thereof, preferably representing about 1% to 10%, by weight, of the total amount of the raw material being treated in the installation. In a manner to be described hereinafter, this fraction of the cold raw material is delivered to pneumatic injection nozzle 20 mounted in casing 12 and extending substantially parallel to the kiln axis. The nozzle is directed towards the upstream end of the kiln for injecting the cold, dry, finely divided raw material fraction through the upstream end into the kiln to form dust cloud 32 of the raw material occupying substantially the entire cross section of the kiln at this end.

As shown in FIG. 2, conduit 35 connects dosing device 26 to mixing chamber 22 mounted in carrier gas supply conduit 37 connected to injection nozzle 20. Fan or compressor 24 delivers a carrier gas into conduit 37 so that the fraction of the cold raw material is introduced in chamber 22 into the carrier gas whereby the raw material fraction is injected through nozzle 20 into the smoke chamber. Control means including valve 34, venturi 36 and pressure gage 38 regulates the amount and pressure of carrier gas and the dosing device controls the amount of cold raw material flowing to the injection nozzle. In this manner, it is possible to control this fraction of cold raw material so as to prevent encrustations while restricting thermal losses to a minimum. The carrier gas may be air or a fraction of the hot flue gases is cooled and the cooled flue gas fraction is used as the carrier gas.

As shown in broken lines in FIG. 2, conduit 39 may branch off from conduit 37, leading either to further pneumatic injection nozzle 20' or 20" mounted respectively in the ceiling of casing 12 or joint 40 for directing a jet of a further fraction of the cold raw material substantially vertically downwardly into the smoke chamber or the chamber joining the upstream kiln end to the casing. In this way, dust cloud 32' or 32", respectively, is laid down across the upstream kiln end just upstream thereof, in the direction of flow of the preheated raw material entering the kiln.

The depth of penetration of dust cloud 32 into the upstream end of kiln 10 depends primarily on the flow velocity of the hot kiln gases and the velocity of flow of the carrier gas injecting the fraction of cold raw material through nozzle 20. The flow velocity of the carrier gas should be at least about 40 meters per second.

Within the kiln, the hot gases will rapidly brake the forward movement of the particles and some of the particles will fall on the bank of material in the kiln while other particles will be entrained by the hot gases through the smoke chamber and flue 14 into first cyclone 16 of the preheater where they will be mixed with the preheated raw material coming from the upper stages of the preheater and reintroduced therewith through conduit 18 into kiln 10. When the cold particles injected through nozzle 20 and, optionally, nozzle 20' or 20" come into contact with the hot kiln gases, whose temperature is of the order of about 1000° C. to 1200° C., the resultant heat exchange substantially reduces the temperature of the gases.

While the invention has been described in connection with certain now preferred embodiments, it will be understood by those skilled in the art that many modifications and variations may be made in the illustrated structures and that any such equivalent structures are within the scope of this invention, which is defined by the appended claims.

What is claimed is:

1. A method of producing cement clinker from cold, dry, finely divided raw material, which comprises the steps of
   (a) causing hot flue gases to flow in a first direction out of a rotary kiln having an axis,
   (b) suspending a major portion of the finely divided raw material in the hot flue gases until the raw material has been preheated and at least partially decarbonized,
   (c) introducing the preheated and at least partially decarbonized raw material into the kiln, and
   (d) pneumatically injecting a fraction of the cold, dry, finely divided raw material into an end of the kiln and countercurrently to said first direction approximately parallel to the axis of the kiln to form a dust cloud of the raw material occupying substantially the entire cross section of the kiln at said end, the end being upstream with respect to a second direction of flow of the raw material into the kiln.

2. The cement clinker production method of claim 1, wherein the major portion of the raw material is suspended in a heat exchanger and the fraction of the raw material represents between about 1% and 10%, by weight, of the total amount of raw material being treated.

3. The cement clinker production method of claim 1, wherein the hot flue gases are caused to flow out of the rotary kiln through a smoke chamber at the upstream kiln end, and another fraction of the cold, dry, finely divided raw material is injected into the smoke chamber immediately adjacent the end in a substantially vertical, downward direction transverse to the kiln axis.

4. The cement clinker production method of claim 1, wherein a chamber joins the upstream kiln end to a smoke chamber, the hot flue gases are caused to flow out of the rotary kiln through said chambers, and another fraction of the cold, dry, finely divided raw material is injected into the chamber joining the upstream kiln end to the smoke chamber in a substantially vertical, downward direction transverse to the kiln axis.

5. The cement clinker production method of claim 3 or 4, wherein the major portion of the raw material is suspended in a heat exchanger and the fractions of the raw material represent about 1% to 10%, by weight, of the total amount of the raw material being treated.

6. The cement clinker production method of claim 1, 3 or 4, wherein the fraction of the raw material is injected by a carrier gas having a velocity of flow of at least about 40 meters per second.

7. The cement clinker production method of claim 6, wherein the carrier gas is air.

8. The cement clinker production method of claim 6, wherein a fraction of the hot flue gas is cooled and the carrier gas is the cooled flue gas fraction.

9. An installation for producing cement clinker from a cold, dry, finely divided raw material, which comprises
   (a) a rotary kiln having an axis and an upstream end,
   (b) a casing defining a smoke chamber at the upstream end and receiving hot flue gases from the kiln flowing in a first direction,
   (c) a multi-stage heat exchanger having a last stage and arranged to receive a major portion of the finely divided raw material flowing therethrough to the last stage,
   (d) a flue connecting the smoke chamber to the last heat exchanger stage and directing the flue gases into the heat exchanger for suspending the major portion of the raw material therein until it has been preheated and at least partially decarbonized,
   (e) means for introducing the preheated and at least partially decarbonized raw material into the kiln, and,
   (f) a pneumatic injection nozzle mounted in the casing, extending substantially parallel to the kiln axis and directed towards the upstream kiln end for injecting a fraction of the cold, dry, finely divided raw material through the upstream end into the kiln to form a dust cloud of the raw material occupying substantially the entire cross section of the kiln at said end.

10. The installation of claim 9, comprising a further pneumatic injection nozzle mounted in the casing for directing a jet of a further fraction of the cold raw material substantially vertically and downwardly into the smoke chamber.

11. The installation of claim 9, further comprising a chamber joining the upstream kiln end to the casing and another pneumatic injection nozzle arranged for directing a jet of another fraction of the cold raw material substantially vertically and downwardly into the joining chamber.

12. The installation of claim 10 or 11, further comprising a supply of carrier gas connected to the injection nozzle, means for introducing the fraction of the cold raw material into the carrier gas whereby the raw material fraction is injected through the nozzle into the smoke chamber, and control means for regulating the amount of carrier gas and raw material flowing to the injection nozzle.

* * * * *